(12) United States Patent
Stenton

(10) Patent No.: US 7,502,166 B2
(45) Date of Patent: Mar. 10, 2009

(54) OPTICAL SIGHT HAVING OBSCURED RETICLE ILLUMINATION

(75) Inventor: Conrad Stenton, Midland (CA)

(73) Assignee: Raytheon Company, Waltham, MA (US)

( * ) Notice: Subject to any disclaimer, the term of this patent is extended or adjusted under 35 U.S.C. 154(b) by 200 days.

(21) Appl. No.: 11/702,683

(22) Filed: Feb. 5, 2007

(65) Prior Publication Data

US 2008/0186570 A1    Aug. 7, 2008

(51) Int. Cl.
G02B 23/00 (2006.01)
(52) U.S. Cl. .................................................. 359/428
(58) Field of Classification Search .................. 359/428
See application file for complete search history.

(56) References Cited

U.S. PATENT DOCUMENTS

| | | | | |
|---|---|---|---|---|
| 2,392,979 A * | 1/1946 | Douden | ................ | 250/467.1 |
| 2,476,340 A * | 7/1949 | Wallhausen | ............. | 250/467.1 |
| 3,121,163 A * | 2/1964 | Rickert | ................... | 250/467.1 |
| 3,230,627 A * | 1/1966 | Rickert et al. | .............. | 356/247 |
| 3,320,671 A * | 5/1967 | Rickert et al. | ................ | 42/123 |
| 4,121,103 A * | 10/1978 | Calhoun | .................. | 250/343 |
| 4,168,429 A * | 9/1979 | Lough | .................... | 250/330 |
| 4,417,814 A | 11/1983 | Doliber | ..................... | 356/252 |
| 4,710,636 A * | 12/1987 | Martino | .................. | 250/467.1 |
| 5,414,557 A | 5/1995 | Phillips | .................... | 359/428 |
| 6,251,303 B1 | 6/2001 | Bawendi | ............... | 252/301.4 R |
| 6,918,946 B2 | 7/2005 | Korgel et al. | .............. | 75/362 |
| 7,078,276 B1 | 7/2006 | Zurcher et al. | .............. | 438/151 |
| 2004/0234812 A1 | 11/2004 | Naito et al. | ................ | 428/690 |
| 2008/0186485 A1 * | 8/2008 | Stenton | ..................... | 356/251 |

* cited by examiner

Primary Examiner—Lee Fineman
(74) Attorney, Agent, or Firm—H. St. Julian

(57) ABSTRACT

An optical sight includes an optical train with a reticle having a reticle substrate, and a reticle relief pattern in the reticle substrate having a relief surface oriented so that the relief surface faces an output end of the optical sight. A layer of a barrier material that is opaque to visible light is deposited upon the relief surface. There is a wavelength-converting material within the reticle relief pattern that converts a non-visible excitation wavelength to visible light. A light source of the non-visible excitation wavelength controllably illuminates the wavelength-converting material. The optical train prevents the non-visible wavelength from propagating out of the input end of the optical train.

13 Claims, 2 Drawing Sheets

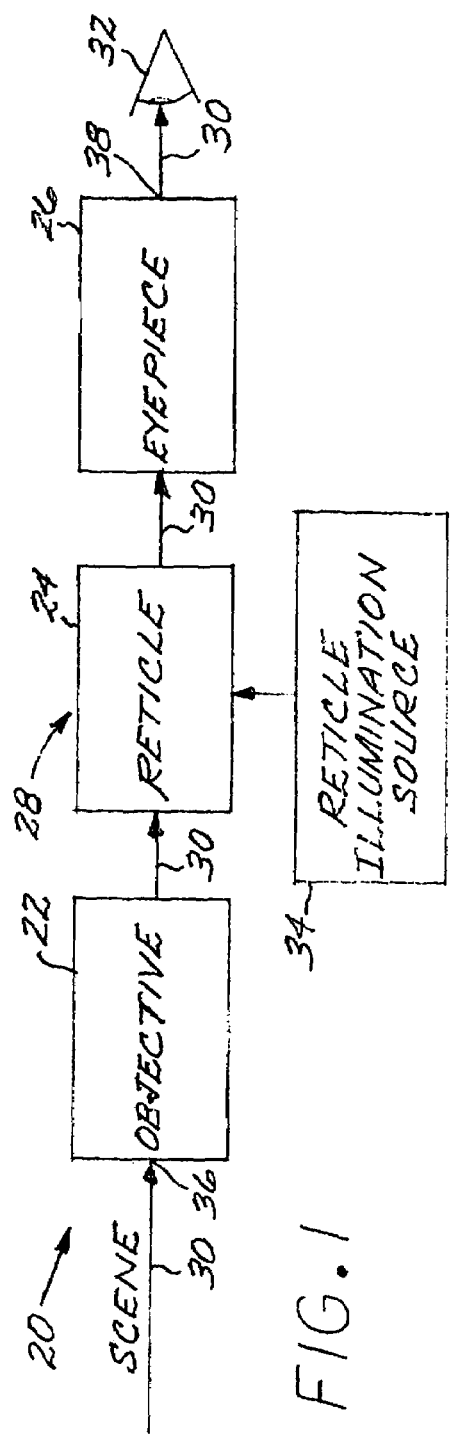
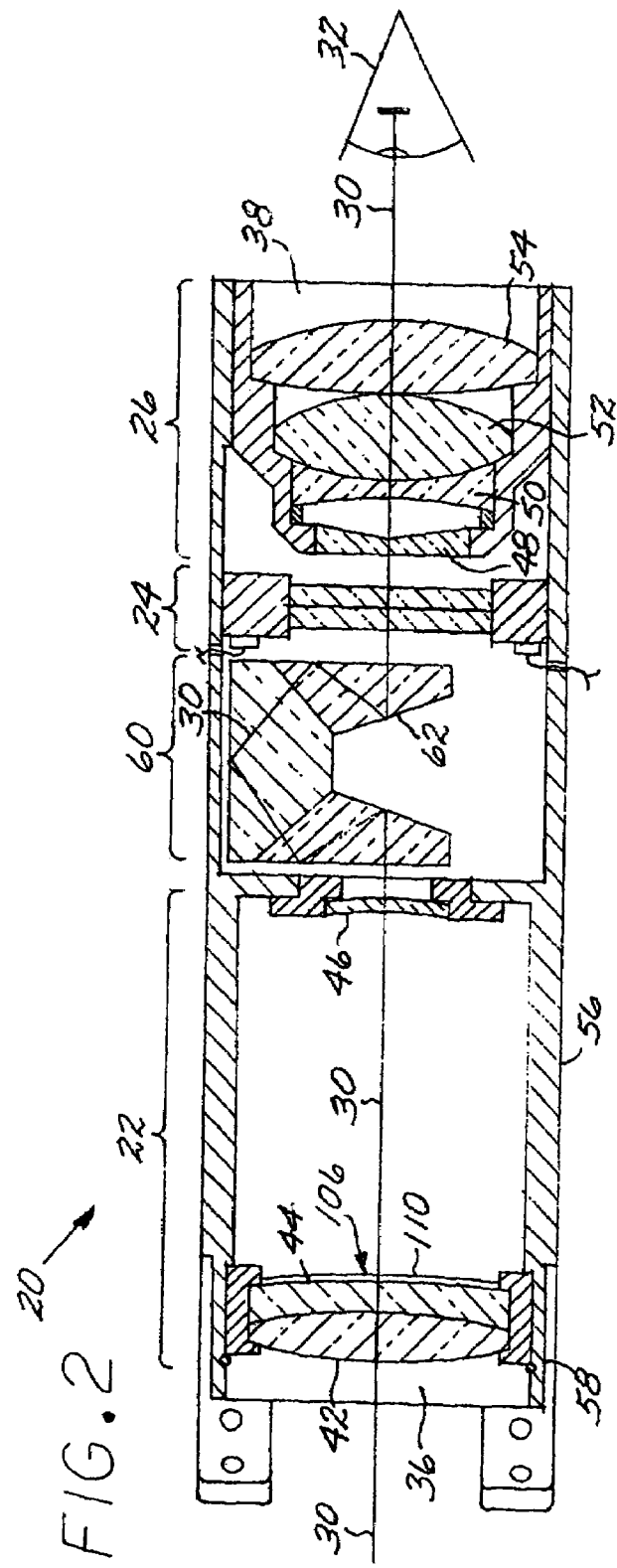

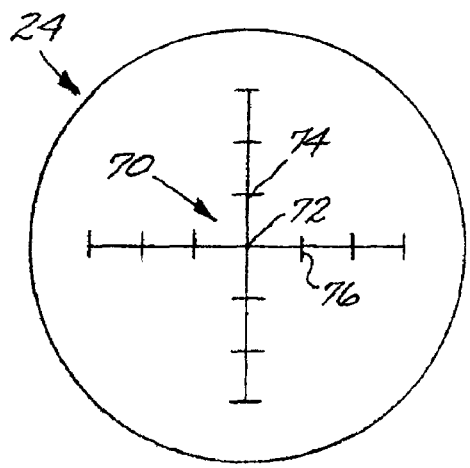
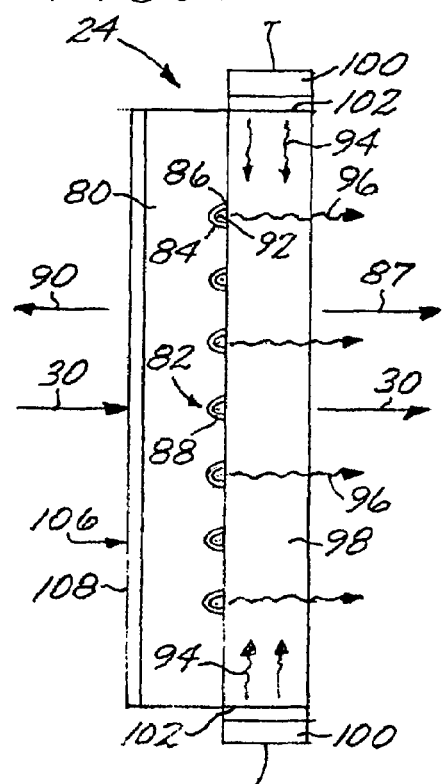
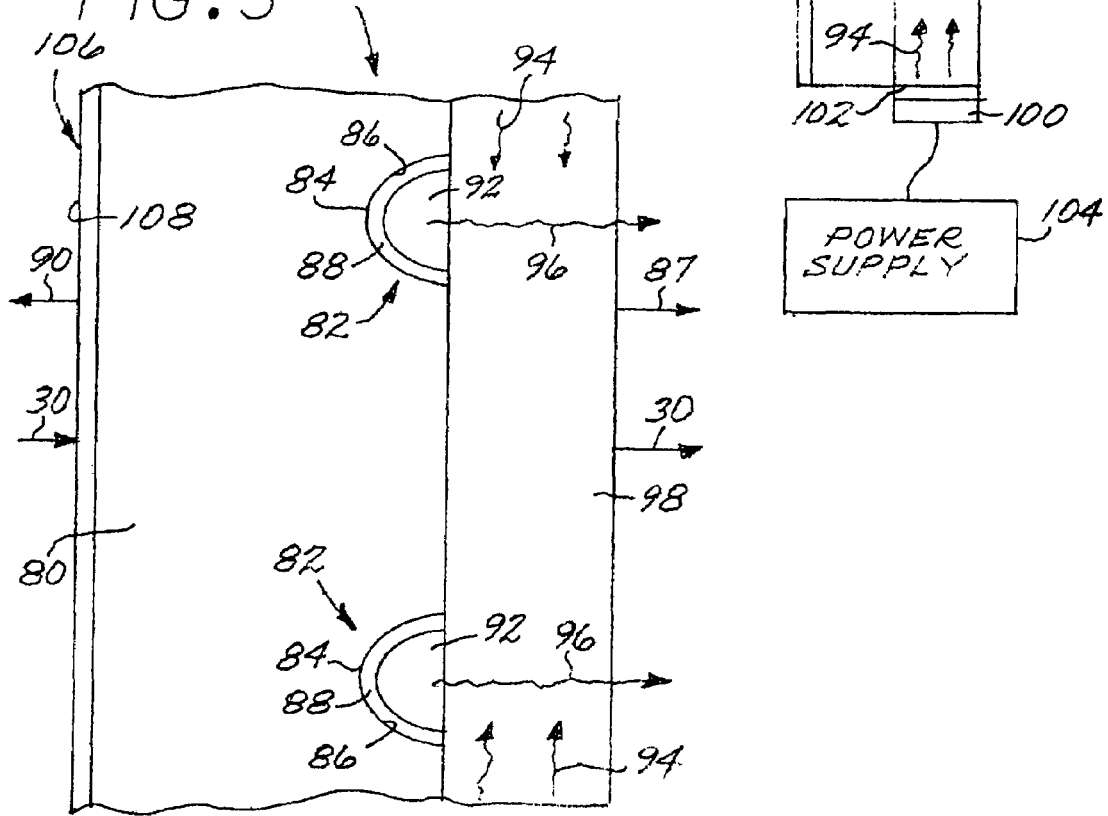

OPTICAL SIGHT HAVING OBSCURED RETICLE ILLUMINATION

This invention relates to an optical sight having a reticle and, more particularly, to such an optical sight constructed to prevent its detection as a result of radiated energy.

BACKGROUND OF THE INVENTION

Refractive or reflective optical sights are used in a wide variety of applications to obtain increased magnification of a scene. In one common application, an optical sight is affixed to the upper side of the barrel of a rifle-type weapon used by a soldier. The user sights through the optical sight to acquire a target and aim the weapon toward the target to increase the likelihood of hitting the target with a projectile fired from the weapon.

A reticle is typically provided in the optical path of the optical sight. The reticle normally has reference markings or other information that aids the user in aiming the optical sight and thence the weapon toward the intended target. The reference markings usually include a cross hair or similar marking to indicate the bore sight of the weapon. The reference markings may also include elevation, windage, and other reference markings that assist in aiming the weapon.

The reticle may be illuminated by an artificial light source within the optical sight. The reticle illumination ensures that the reticle will be visible in lighting conditions including normal daylight, low-light ambient conditions, and, particularly for infrared and other optical sights to be used at night, in near-darkness conditions. If only ambient light is used to illuminate the reticle, the illumination may be uneven and undependable.

The illumination of the reticle ideally satisfies a number of requirements. The illumination of the reticle must not interfere with the observation of the scene being viewed, yet the reticle must stand out against the scene. The reticle output desirably is adjustable and has low power consumption. The reticle illumination must be relatively uniform over the entire reticle so that the entire exit pupil is filled. Existing illumination approaches do not fully meet these requirements.

There is a need for an approach for an improved optical sight having an illuminated reticle. The present invention fulfills this need, and further provides related advantages.

SUMMARY OF THE INVENTION

Beyond the requirements discussed above, it is highly desirable in military applications that the optical sight be "covert". That is, the presence and use of the optical sight should not reveal the location of the optical sight to potential adversaries who, if warned, could get out of view or fire at the optical sight. One cause of potential concern is that exterior light may reflect from the lenses of the optical sight to reveal the presence of the optical sight. This indicator of the presence of the optical sight may be controlled through the use of visible-light reflective coatings on the optical sights.

Another potential indicator of the presence of the optical sight is light that escapes from the optical sight. The source of such light leakage may be the visible light that marks the reticle, or non-visible light used to illuminate and thereby excite a phosphorescent material in the reticle. Such light leakage could propagate from the area of the reticle, out the input end of the reticle, and to an observer of visible light or a detector of non-visible light.

The present invention prevents such light leakage from the reticle and its illumination. The present approach does not interfere with or alter the operation of the optical sight and its illuminated reticle, does not adversely affect the performance of the reticle, and does not consume energy.

In accordance with the invention, an optical sight comprises an optical train having an input end and an output end, and defining an optical path from the input end to the output end. The optical train has at least one powered optical element. The optical train includes as an optical element a reticle that comprises a reticle substrate, a reticle relief pattern in the reticle substrate having a relief surface oriented so that the relief surface faces the output end, and a layer of a barrier material that is opaque to visible light deposited upon the relief surface. A wavelength-converting material is within the reticle relief pattern such that the layer of the barrier material lies between the wavelength-converting material and the relief surface of the reticle relief pattern. The wavelength-converting material is excitable by a non-visible excitation wavelength of light to emit a visible wavelength of light. There is a light source of the non-visible excitation wavelength that controllably illuminates the wavelength-converting material. The optical train prevents the non-visible wavelength from propagating out of the input end of the optical train. Typically, there is a housing that encloses the optical train.

Preferably, the optical train includes at least one optically powered lens in addition to the reticle. In a typical case, in addition to the reticle, the optical train includes an objective, an image erector, and an eyepiece. Normally in such an arrangement, the reticle lies between the objective and the eyepiece, and more preferably within the image erector, between the image erector and the eyepiece, or within the eyepiece.

Preferably, the non-visible wavelength is an ultraviolet wavelength, and the light source is a source of ultraviolet light. The light source may be, for example, one or more ultraviolet light emitting diodes.

The wavelength-converting material is preferably a phosphorescent material. Most preferably, the wavelength-converting material is a quantum-dot (sometimes termed a "nano-dot") phosphorescent material.

As discussed previously, the optical train prevents the non-visible wavelength from propagating out of the input end of the optical train. Several approaches are of particular interest. In one, the substrate is made of a material that is transparent to visible light and not transparent to light of the non-visible excitation wavelength. In another, there is a coating on the substrate, wherein the coating is not transparent to light of the non-visible excitation wavelength. In yet another approach, a filter structure is disposed to permit light of the non-visible excitation wavelength to reach the wavelength-converting material but not to reach the input end of the optical train, while permitting visible light to enter the input end and pass to the output end. Such a filter may be, for example, a coating on one of the objective lenses.

The present approach provides a controllably illuminated reticle pattern that is visible to the user of the optical sight under a wide variety of daylight, semi-darkness, and darkness conditions. The reticle pattern and its excitation energy are not, however, visible to someone trying to detect the presence of the user of the optical sight either with the unaided eye or using a detector, inasmuch as emissions from the input end of the optical sight are obscured by techniques that do not in turn block the visibility of the target to the user of the optical sight. The present approach adds little to the cost of the optical sight, while providing these significant benefits.

Other features and advantages of the present invention will be apparent from the following more detailed description of the preferred embodiment, taken in conjunction with the accompanying drawings, which illustrate, by way of example, the principles of the invention. The scope of the invention is not, however, limited to this preferred embodiment.

BRIEF DESCRIPTION OF THE DRAWINGS

FIG. 1 is a block diagram of an optical sight;

FIG. 2 is a lengthwise sectional view of one physical embodiment of the optical sight of FIG. 1;

FIG. 3 is a front elevational view of an embodiment of a reticle;

FIG. 4 is a schematic sectional enlarged view of the reticle of FIG. 2; and

FIG. 5 is an enlarged detail of a portion of the reticle section of FIG. 4.

DETAILED DESCRIPTION OF THE INVENTION

FIG. 1 depicts in general form an optical sight 20 according to the present approach. The optical sight 20 comprises optical elements including an objective 22, a reticle 24, and an eyepiece 26. Each of the objective 22 and the eyepiece 26 preferably includes one or more optically powered lenses. The objective 22, the reticle 24, and the eyepiece 26 together constitute an optical train 28 with an optical path 30 therethrough shown as a vector. Light travels along the optical path 30 from a scene to an input end 36 at of the optical train 28 at the objective 22, from the objective 22 to the eyepiece 26, from the eyepiece 26 to an output end 38 of the optical train 28, and thence to an eye 32 of the user of the optical sight. The input end 36 is at the front of the objective 22 nearest the scene, and the output end 38 is at the back of the eyepiece 26 nearest the eye 32 of the user. The reticle 24 is superimposed upon and coincident with the optical path 30 at some point before the optical path 30 enters the eye 32 of the user. The reticle 24 is illuminated by a reticle illumination source 34.

FIG. 2 depicts a preferred physical embodiment of the optical sight 20 shown generally in FIG. 1. Previously described elements are indicated, and the prior description is incorporated. The objective 22 includes three objective lenses 42, 44, and 46, with lenses 42 and 44 being a cemented doublet. The eyepiece 26 includes four eyepiece lenses 48, 50, 52, and 54. This arrangement of the lenses for the objective 22 and the eyepiece 26 is illustrative. Other types of objectives 22 and eyepieces 26 may be used, including those in which some or all of the elements are reflective elements rather than refractive elements. All of the elements are enclosed in a housing 56, which has an attachment 58 for attaching the housing 56 to a rifle or other structure (not shown) that is to be aimed with the assistance of the optical sight 20.

The objective 22 inverts the image from the scene as it travels along the optical path 30. To re-invert the image so that it may be comfortably viewed by the user without changing the magnification of the image, an optional optically unpowered image erector (also called an image inverter), illustrated as an erector prism 60, is positioned on the optical path 30 between the objective 22 and the eyepiece 26 as part of the optical train 28. The erector prism 60 includes mirror surfaces provided as three prism elements, and the optical path 30 is reflected from reflecting surfaces of the erector prism 60 as it passes through the erector prism 60 as illustrated in FIG. 2. The optical path 30 leaves the erector prism 60 on its way to the eyepiece 26 after reflecting from a final reflecting surface 62.

The reticle 24 includes a reticle pattern 70 of markings that provide a spatial reference for the user looking through the optical sight 20. FIG. 3 illustrates an exemplary reticle pattern 70. There is typically a boresight marking 72, such as a cross hair, and there may be other markings such as elevation markings 74 and/or windage markings 76. The reticle 24 may be a preferred freestanding element, or it may be defined on a surface through which the optical path 30 passes or from which the optical path 30 is reflected. The preferred freestanding reticle 24 will be described in more detail herein, but the principles are applicable to a reticle integral with the image erector or other optical component. The freestanding reticle 24 may be positioned between the objective 22 and the eyepiece 26 as illustrated, or may be part of the eyepiece 26.

FIG. 4 depicts the structure of the reticle 24, and FIG. 5 is an enlarged detail. The reticle 24 includes a reticle substrate 80 and a reticle relief pattern 82 formed into the reticle substrate 80. The reticle substrate 80 is transparent to the visible light transmitted along the optical path 30. The individual recesses 84 of the reticle relief pattern 82 correspond to and define the desired reticle pattern 70. The individual recesses 84 of the reticle relief pattern 82 are formed into the substrate 80 by any operable approach, with etching or engraving being preferred. The width and depth of the individual recesses 84 are not critical, but the width is typically about 8 micrometers and the depth is typically about 3 micrometers. Relief surfaces 86 are the surfaces of the individual recesses 84 and face in a direction 87 (parallel to the optical path 30) toward the output end 38.

A layer 88 of a barrier material that is opaque to visible light is deposited upon each of the relief surfaces 86. The barrier material may be any operable opaque material. A preferred barrier material is a thin layer of a metal such as chromium. The barrier-material layer 88 must be of sufficient thickness that the selected barrier material prevents visible light from propagating from the remainder of the recess 84 in a direction 90 (opposite to the optical path 30) toward the input end 36 of the optical train 28. A typical thickness of the barrier-material layer 88 sufficient to prevent the transmission of light therethrough is about 5 micrometers.

A wavelength-converting material 92 lies within the remaining portion of the recesses 84 of the reticle relief pattern 82. The layer 88 of the barrier material lies between the wavelength-converting material 92 and the relief surface 86 of the recess 84 of the reticle relief pattern 82. The wavelength-converting material 92 is excitable by a non-visible excitation wavelength of light, represented by non-visible light rays 94, to emit a visible wavelength of light, represented by visible light rays 96.

The wavelength-converting material 92 is preferably a phosphorescent material and, when excited by the non-visible light rays 94, fluoresces to emit the visible light rays 96. A number of operable phosphorescent materials are known and are operable.

Most preferably, the wavelength-converting material 92 is a member of a class of phosphorescent materials known as quantum-dot light emitters. The quantum-dot (also sometimes termed "nano-dot") light emitter is a nanophosphor material formed of a mass of particles of phosphorescent material having particle sizes much smaller than the wavelength of visible light. These quantum-dot light emitters are excited by light of an excitation wavelength and emit light of an output wavelength. For the present application, the output wavelength is the visible wavelength range, so that the light output of the visible light rays 96 is visible to the unaided human eye peering through the output end 38 of the optical sight 20. The excitation wavelength is preferably a non-visible wavelength so that the excitation light is not visible to the unaided human eye. Most preferably, the excitation wavelength is in the ultraviolet wavelength range, typically less than about 450 nanometers wavelength, and most preferably about 395-400 nanometers wavelength.

Operable quantum-dot light emitters 86 include materials such as cadmium sulfide, cadmium telluride, silicon, and germanium, processed with a surfactant to a very small nano-dot size much smaller than the wavelength of visible light, and encapsulated. Quantum-dot light emitters are described, for example, in U.S. Pat. Nos. 7,078,276; 6,918,946; and 6,251,303, whose disclosures are incorporated by reference. Quantum-dot light emitters are available commercially from companies such as American Dye Source, Inc., Baie d'Urfe, Quebec Canada.

The selection of quantum-dot light emitters has several important advantages for forming the reticle pattern 70. Because the nano-dots are small, a large fraction of the atoms in each nano-dot are near the surface of the nano-dot, and accordingly can participate in the light-emission process. The energy-conversion efficiency of the wavelength-converting material 92 using the quantum-dot light emitter is therefore very high, reducing the power required to form the illuminated reticle pattern 70. The emitted light wavelength is determined by both the chemical composition of the nano-dots and also their size. Accordingly, the color of the reticle pattern 70 may be controlled according to the selected chemical composition and size of the nano-dots.

A cover sheet 98 of a material such as a glass overlies the side of the reticle substrate 80 facing in the direction 87 toward the output end 38. The cover sheet 98 is selected to be transparent to the light propagating along the optical path 30, transparent to the visible light rays 96, and transparent to the non-visible light rays 94. In combination with the reticle substrate 80, the cover sheet 98 protects the wavelength-converting material 92 and the barrier-material layer 88 within the individual recesses 84 of the reticle-relief pattern 82.

The reticle 24 further includes a light source 100 producing the non-visible light rays 94 of the excitation wavelength, an ultraviolet wavelength in the preferred application. The light source 100 is positioned to direct the non-visible light 94 to be incident upon the wavelength-converting material 92 as its excitation light. To do this, the light source 100 directs the non-visible light 94 into the cover sheet 98, and the non-visible light 94 reflects within the cover sheet 98 until it is incident upon the wavelength converting material 92. The light source 100 is preferably an ultraviolet-wavelength (UV) light-emitting diode (LED). Such UV LEDs are available commercially from companies such as Kingbright Corporation, City of Industry, Calif. In the embodiment illustrated in FIG. 4, the light source 100 includes a number of UV LEDs positioned around a periphery 102 of the cover sheet 98. The UV LEDs are oriented to direct the non-visible light 94 toward the wavelength-converting material 92 within the reticle relief pattern 82. When the non-visible light 94 is incident upon the wavelength-converting material 92 as its excitation-wavelength light, the wavelength-converting material 92 emits the visible-wavelength light 96 toward the output end 38 and thence to the eye 32 of the user who is peering through the optical sight 20.

As shown in FIG. 4, the light sources 100 are powered by a power supply 104. The power supply 104 is preferably of a controllable output power, so that the intensity of the excitation-wavelength light of the non-visible light 94 produced by the light sources 100 may be adjusted by the user.

An important feature of the present approach is that light from the reticle 24 cannot escape from the input end 36 of the optical sight 20 to serve as a basis for an adversary to detect the use of the optical sight 20 and the illuminated reticle 24. The barrier-material layer 88 prevents any of the visible light 96 from propagating in the direction 90 toward the input end 36. If such visible light 96 were to escape from the input end 36, it could possibly be detected by the unaided eye of an adversary.

If the non-visible light 94 that serves as the excitation light for the wavelength-converting material 92 were to escape from the input end 36, it could not be detected by the unaided eye of an adversary, but it could possibly be detected by the proper type of detection instrument used by the adversary, for example an ultraviolet-light detector. It is therefore preferred to prevent any of the non-visible light 94 from propagating out of the input end 36 of the optical sight 20.

Any operable technique may be used to prevent the non-visible light 94 from escaping from the input end 36. Several such techniques are preferred, any of which may be employed individually or in combination with any of the others. In the first technique, the reticle substrate 80 is made of a material that is transparent to visible light of the optical path 30 and is not transparent to light having the wavelength of the non-visible light 94. The non-visible light 94 propagates through the cover sheet 98 from the light sources 100 to the wavelength-converting material 92, but cannot propagate through the reticle substrate 80 toward the input end 36.

In a second technique, a filter structure 106 may be provided to permit non-visible light 94 to reach the wavelength-converting material 92 but not to reach the input end 36 of the optical train 28, while permitting visible light of the optical path 30 to enter the input end 36 and pass to the output end 38. Two variations of the filter structure 106 are of most interest. In one, shown in FIGS. 4-5, a coating 108 is placed onto the surface of the reticle substrate 80. The coating 108 is not transparent to the non-visible light 94, but is transparent to the light of the optical path 30. Such selectively transparent coatings 108 are typically multilayer coatings that are custom-designed using known principles. Computer programs used to design such wavelength-selective coatings are commercially available, and for example include the Filmstar®, Film-Wizard, and TF Calc programs. In another variation of the filter structure 106, a coating 110 similar to the coating 108 is deposited upon a surface of the optical train 28 positioned between the reticle 24 and the input end 36. An illustrative example is the coating 110 deposited upon the objective lens 44 as shown in FIG. 2. The coating 108 functions in a manner identical to the coating 108 to prevent non-visible light 94 from reaching and escaping from the input end 94, while allowing visible light propagating on the optical path 30 to pass through the optical train 28 to the output end 38. The coating 110 is designed using the same approach as the coating 108.

Although a particular embodiment of the invention has been described in detail for purposes of illustration, various modifications and enhancements may be made without departing from the spirit and scope of the invention. Accordingly, the invention is not to be limited except as by the appended claims.

What is claimed is:

1. An optical sight, comprising:
    an optical train having an input end and an output end, and defining an optical path from the input end to the output end, wherein the optical train has at least one powered optical element, and wherein the optical train includes as an optical element a reticle that comprises:

a reticle substrate, a reticle relief pattern in the reticle substrate having a relief surface oriented so that the relief surface faces the output end, a layer of a barrier material that is opaque to visible light deposited upon the relief surface, a wavelength-converting material within the reticle relief pattern such that the layer of the barrier material lies between the wavelength-converting material and the relief surface of the reticle relief pattern, wherein the wavelength-converting material is excitable by a non-visible excitation wavelength of light to emit a visible wavelength of light, and a light source of the non-visible excitation wavelength that controllably illuminates the wavelength-converting material, wherein the optical train prevents the non-visible wavelength from propagating out of the input end of the optical train.

2. The optical sight of claim 1, wherein the optical train includes at least one optically powered lens in addition to the reticle.

3. The optical sight of claim 1, wherein the optical train includes an objective, an image erector, and an eyepiece.

4. The optical sight of claim 1, wherein the optical train includes an objective, an image erector, and an eyepiece, and wherein the reticle lies between the image erector and the eyepiece.

5. The optical sight of claim 1, wherein the light source is a source of ultraviolet light.

6. The optical sight of claim 1, wherein the light source is an ultraviolet light emitting diode.

7. The optical sight of claim 1, further including a housing that encloses the optical train.

8. The optical sight of claim 1, wherein the wavelength-converting material is a phosphorescent material.

9. The optical sight of claim 1, wherein the wavelength-converting material is a quantum-dot phosphorescent material.

10. The optical sight of claim 1, wherein the reticle substrate is made of a material that is transparent to visible light and not transparent to light of the non-visible excitation wavelength.

11. The optical sight of claim 1, further including a coating on the reticle substrate, wherein the coating is not transparent to light of the non-visible excitation wavelength.

12. The optical sight of claim 1, further including a filter structure disposed to permit light of the non-visible excitation wavelength to reach the wavelength-converting material but not to reach the input end of the optical train, while permitting visible light to enter the input end and pass to the output end.

13. An optical sight, comprising:

an optical train defining an optical path and having at least one optical element, wherein the optical train comprises an optically powered objective, an optically powered eyepiece, and a reticle comprising a reticle substrate, a reticle relief pattern in the reticle substrate having a relief surface oriented so that the relief surface faces the output end, a layer of a barrier material that is opaque to visible light deposited upon the relief surface, a wavelength-converting material within the reticle relief pattern such that the layer of the barrier material lies between the wavelength-converting material and the relief surface of the reticle relief pattern, wherein the wavelength-converting material is excitable by a non-visible excitation wavelength to emit a visible wavelength of light, and a light source of the non-visible excitation wavelength that controllably illuminates the wavelength-converting material, wherein the optical train prevents the non-visible wavelength from propagating out of the input end of the optical train; and a housing that encloses the optical train.

* * * * *